Figure 1:
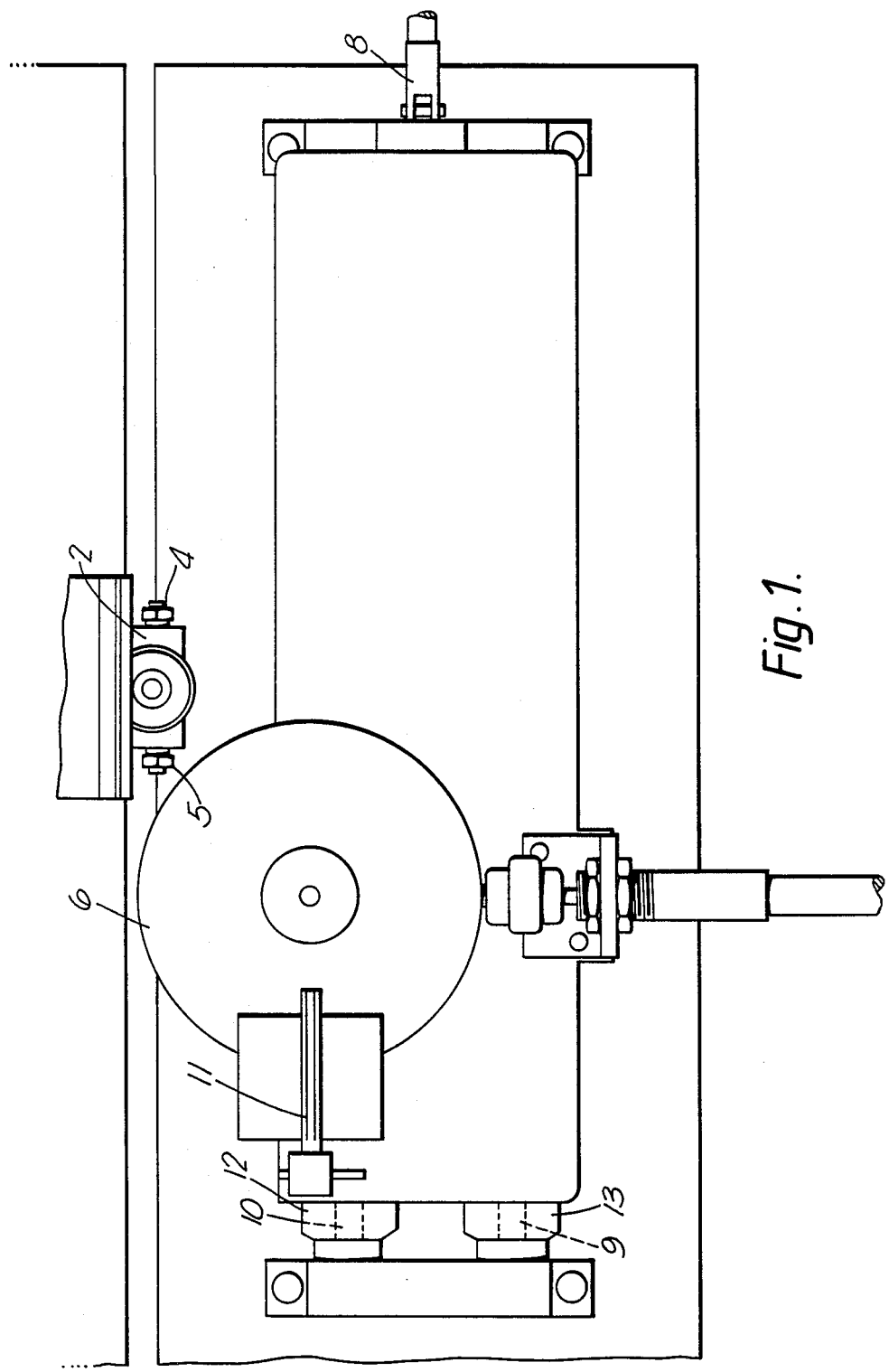

United States Patent [19]
Hall et al.

[11] Patent Number: 4,818,450
[45] Date of Patent: Apr. 4, 1989

[54] APPARATUS AND METHOD FOR FORMING PELLETS

[75] Inventors: Alan J. Hall, Stockton on Tees; Frank A. Kirk, Easingwold; Alan M. Patterson, Guisborough; Peter M. Paxton, Northallerton, all of England

[73] Assignee: Imperial Chemical Industries, PLC, Great Britain

[21] Appl. No.: 923,218

[22] Filed: Oct. 27, 1986

[30] Foreign Application Priority Data

| Nov. 8, 1985 | [GB] | United Kingdom | 8527661 |
| Apr. 30, 1986 | [GB] | United Kingdom | 8610612 |
| Aug. 7, 1986 | [GB] | United Kingdom | 8619329 |

[51] Int. Cl.⁴ ............................................. B29C 47/00
[52] U.S. Cl. ...................... 264/39; 264/143; 264/555; 425/72.1; 425/142; 425/308
[58] Field of Search ............... 264/141, 143, 142, 140, 264/39, 555; 425/308, DIG. 101, 72.1, 142; 83/177, 402, 403

[56] References Cited

U.S. PATENT DOCUMENTS

| 2,408,164 | 9/1946 | Foster | 252/259.2 |
| 2,447,617 | 8/1948 | Nelson | 83/403 |
| 2,805,229 | 9/1957 | Metzger | 260/348.5 |
| 3,119,294 | 1/1964 | Billingsley et al. | 83/402 |
| 3,460,418 | 8/1969 | Matte et al. | 83/168 |
| 3,846,529 | 11/1974 | Poteet, III | 264/142 |
| 3,876,324 | 4/1975 | Ballard | 83/431 |
| 3,964,355 | 6/1976 | Daniels | 83/402 |
| 4,021,176 | 5/1977 | Dehmer et al. | 264/142 |

FOREIGN PATENT DOCUMENTS

| 1920976 | 11/1969 | Denmark . | |
| 0003642 | 8/1979 | European Pat. Off. . | |
| 179584 | 4/1986 | European Pat. Off. . | |
| 3041705 | 6/1982 | Fed. Rep. of Germany | 264/142 |
| 7029415 | of 0000 | Japan | 264/142 |
| 54-100457 | 8/1979 | Japan . | |
| 0100457 | 9/1979 | Japan | 425/308 |
| 0168609 | 9/1985 | Japan | 264/143 |
| 916364 | 1/1963 | United Kingdom . | |
| 2057905 | 4/1981 | United Kingdom . | |
| 2106028 | 4/1983 | United Kingdom . | |

Primary Examiner—Jan H. Silbaugh
Assistant Examiner—Neil M. McCarthy
Attorney, Agent, or Firm—Cushman, Darby & Cushman

[57] ABSTRACT

Pellets which are formed by extruding and cutting may be squashed in the latter operation. Squashing is reduced by passing a strand of extruded material downwardly under the influence of gravity and cutting the strand horizontally with a blade, preferably supporting the strand against the cutting blade by blowing gas against it when cutting.

8 Claims, 2 Drawing Sheets

APPARATUS AND METHOD FOR FORMING PELLETS

This invention comprises apparatus and a method of forming pellets.

Pellets are often made by extruding a strand and cutting it into pieces. The cutting action tends however to squash the pellets, and if pellets with "square" ends (ie with ends at right angles to the axis of the pellet) are required they may have to be produced by compression. The compression process may be undesirable as being slower or more expensive, or in the case of catalyst pellets comprising porous material may be undesirable in that the resulting pellets may be less porous because of the compression.

In the production of catalyst pellets, uniformity of shape and "squareness" of pellet ends may be desirable in order to optimise packing in catalyst beds and reactant and product permeation within the pellets. Catalyst pellets are commonly made by shaping a pellet of material in a deformable or "plastic" condition (commonly called a "green" state in the ceramic arts, which term has no necessary reference to the colour of the material) and heat treating it to set it into a hard form. It is in general desirable if shaping takes the form of extruding the material in a plastic condition followed by cutting to form the pellets that cutting should take place whilst the material is still plastic as after the heat treatment the hard material normally causes considerable wear on blades used to cut it and the use of diamond saw blades may be needed. Whilst in the plastic condition the pellets are however subject to squashing when they are cut.

Catalyst pellets are often prepared by a process in which porous pellets of hard material are produced by extruding and cutting a deformable material to form the pellets and heat treating them to harden them and optionally burn off any organic matter which is present and subsequently depositing catalytically active materials on the hard pellets. The hard pellets before deposition of the said catalytically active materials may be regarded as catalyst supports.

Hollow pellets in their plastic deformable state for example hollow cylindrical pellets are particularly vulnerable to squashing and substantially cylindrical pellets with a number of small holes through them passing parallel to their axis, for example pellets as described in ICI U.S. Pat. No. H 33277, European patent No. 179584 are vulnerable in that some small holes can be closed if the pellet is squashed.

Pellets with external protrusions, for example those of cross sections which are "star shaped" or "cogwheel" shaped are also vulnerable to squashing.

We have found that less squashing of pellets occurs, and the ends of pellets can be made more nearly at right angles to the axis of the pellet ("square") if the extruded strand is passed downwardly under the influence of gravity and cut horizontally by passing a blade substantially horizontally through it.

The invention therefore comprises a process of forming pellets which comprises extruding a strand of deformable pellet forming material, and passing the strand downwards under the influence of gravity and cutting it horizontally by passing a blade substantially horizontally through the strand to sever pellets from it whilst in a deformable condition.

The invention also comprises, in a process of forming hard, heat resistant pellets which comprises extruding a strand of deformable material, cutting it to sever pellets from it and heat treating the pellets to produce the said hard, heat resistant pellets, the step of passing the said strand downwards under the influence of gravity and cutting it horizontally by passing a blade substantially horizontally through it to sever pellets from it.

The strand may be of any desired cross section, for example rectangular, round, annular or hexagonal and may be hollow or may include several internal holes such as pellets having 3 to 50 internal longitudinal holes.

It is convenient to extrude the strand continuously and in this case a very "square" cut may be secured by moving a cutting member at the same speed and in the same direction as the strand whilst advancing the cutting member transversely through the strand. However we have found that a remarkably good "squareness" can be secured without the mechanical complications involved in traversing the cutter, providing that the strand remains in a fairly flexible state until the cutting operation, by allowing a sufficient length of the strand to hang without substantial constraint to sideways movement above the cutter so as to permit a slight bowing of the strand during the cutting operation; the cutter tends to support the strand during the cutting operation and the additional length extruded during this operation may be taken up by the bowing effect.

Cutting is suitably carried out with a slicing action, preferably by means of a rotating disc blade. It is desirable that the blade should be kept clean, and it is preferred to use a rotating disc blade of which the cutting edge is cleaned at each revolution by passage through a cleaning station, which preferably comprises elements cleaning both the upper and lower surfaces of the blade. Such elements may be abrasive pads, squeegees, or scraper blades or washing and wiping assemblies as required.

The blade is suitably thin so as to minimise compression on the surfaces of the pellets during the cutting action. Suitably the thickness of the areas of the blade passing through pellets is 0.1 to 0.5 mm and preferably 0.2 to 0.4 mm.

It is preferred to hold the strand at the cutting position against the cutting blade at least partly by blowing gas against it. If it is held against the blade only by a support surface sticking may occur and this procedure further reduces deformation.

Figure 2:
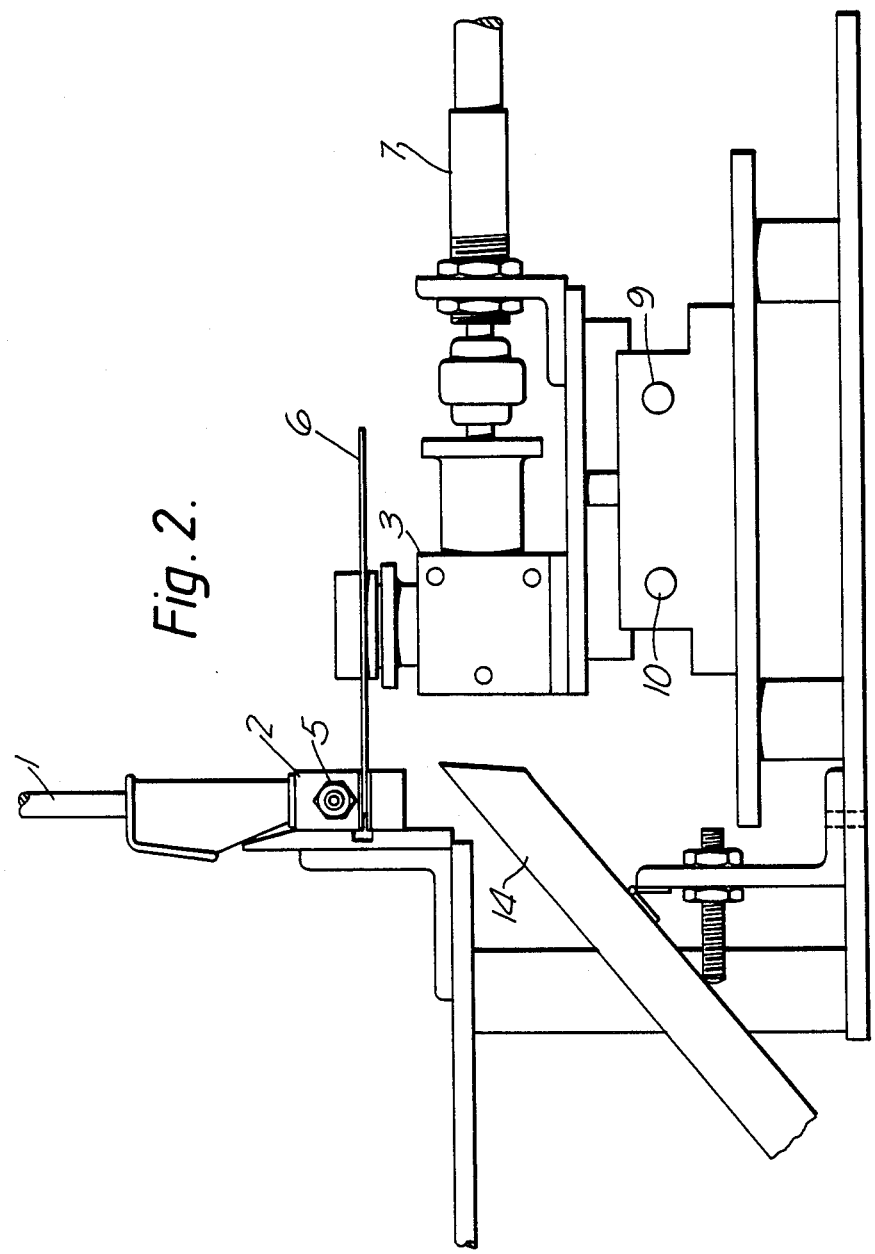

One form of the invention will now be described with reference to FIGS. 1 and 2 which show respectively a downwards view and a sideways view in elevation of a device according to the invention.

A feed mechanism (not shown) comprises a wheel with a circumferential channel for carrying at a steady rate an extruded strand 1 which is to be cut. Guide 2 receives the strand and holds it during a cutting operation, air ducts 4 and 5 being provided to blow air against the strand from opposite sides alternately according to the direction of the cutting action.

Carrier 3 supports a cutting disc 6, the periphery of which up to the cutting edge is of thickness 0.3 mm. The disc is driven by flexible drive 7 through gearing (not shown) in carrier 3. This form of drive enables the mass of the carrier 3 to be low and thus reduces its momentum when it is moved as compared with having an electric motor mounted on the carrier 3 to drive the cutting disc. Carrier 3 is moved by pneumatically controlled rod 8 between stations on opposite sides of guide 2 in response to signals from a metering device (not shown) which meters the length of the strand fed and actuates motion of carrier 3 between its extreme stations when a preset length of strand has been fed. Thus, cutting of the strand takes place at uniform lengths.

Carrier 3 is borne on guides 9 and 10 which are protected from dust by impermeable compressible resilient sleeves of which the ends of two, 12 and 13 are shown which are secured to carrier 3 at one end and to the ends of guides 9 and 10 at the other. Holder 11 holds cleaning pads (not shown) above and below disc 6. Chute 14 is provided to receive severed pellets.

The apparatus operates as follows.

Disc 6 is rotated and a strand fed. When a predetermined length of the strand has been fed a metering device metering the motion of the strand feed wheel actuates pneumatically controlled rod 8 to move carrier 3 to its opposite station thus cutting the strand and simultaneously to admit air in to the opposing air duct 4 or 5 to support the strand against the cutting action. A pellet severed from the strand falls into chute 14.

On each revolution of disc 6 pads held by holder 11 clean debris from the portions of the disc contacting the strand.

It is found that during the cutting action sufficient "lift" is imparted to the strand to induce slight "bowing" so that a remarkably "square" cut of the strand can be achieved by an appropriately rapid cutting action. Little distortion of seven holed cylindrical pellets according to our ICI U.S. Pat. No. H 33277, European patent No. 179584 of an extruded alpha alumina composition was found, and on firing to remove organic matter and sinter the pellets to form an -alumina catalyst support a good geometrical form was maintained.

We claim:

1. A process of forming pellets with little squashing which comprises extruding a strand of deformable pellet forming material, passing the strand downwards for a substantial distance under the influence of gravity and then cutting it horizontally by holding the strand at a cutting position against a cutting blade at least partially by blowing gas against the strand in a direction opposing the cutting blade and severing pellets from the strand by passing the blade substantially horizontally through the strand whilst the strand is in a deformable condition and held by the gas.

2. A process as claimed in claim 1 in which the pellets are subsequently hardened by heat treatment.

3. A process as claimed in claim 1 in which the motion of a cutter comprising the blade is horizontal, the strand is extruded continuously and a sufficient length of strand is allowed to hang without substantial constraint to sideways movement in a flexible state above the cutter so as to permit bowing of the strand during the cutting operation to take up the additional length extruded during the cutting operation.

4. A process as claimed in claim 1 in which the strand is cut with a slicing action.

5. A process as claimed in claim 4 in which said blade is cleaned continuously.

6. Apparatus for forming pellets of deformable material with little squashing which comprises:
   an extruder for extruding a strand of said deformable material, said extruder being adapted to pass the strand downwardly under the influence of gravity;
   a blade at a cutting position a substantial distance below said extruder;
   means at said cutting position for passing said blade substantially horizontally through said strand to cut said strand while it is in a deformable condition; and
   means for at least partly blowing gas against said strand in a direction opposing said blade when said strand is at said cutting position for holding said strand against said blade as said strand is cut.

7. An apparatus as claimed in claim 6 in which said blade is a thin, rotating disc blade.

8. Apparatus as claimed in claim 6 in which the means for cutting the strand is actuated to cut it by a device metering the length of strand fed.

* * * * *